July 31, 1951 — A. H. LEBOFFE — 2,562,498
ILLUMINATING MEANS FOR INDICATING INSTRUMENTS
Filed Dec. 13, 1946
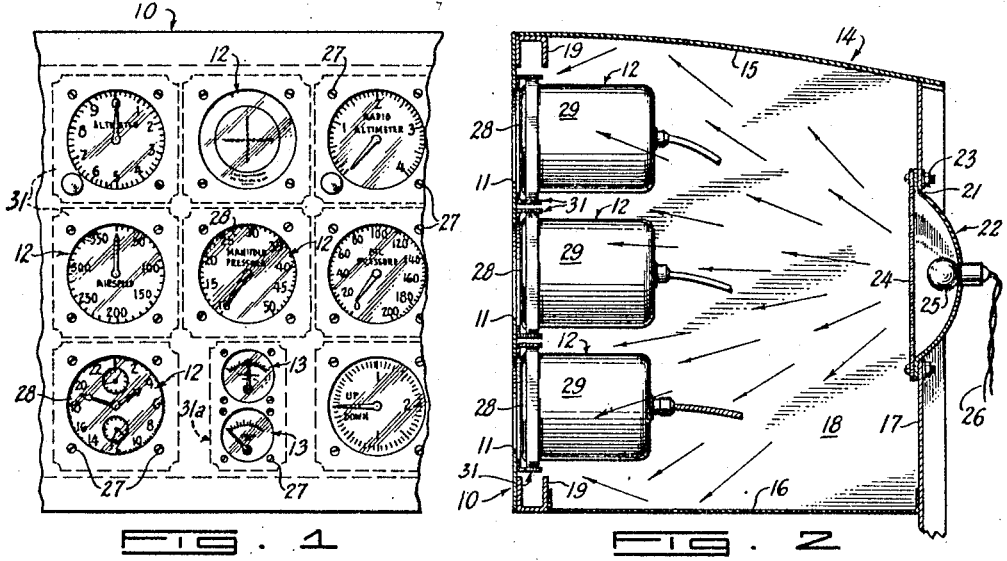
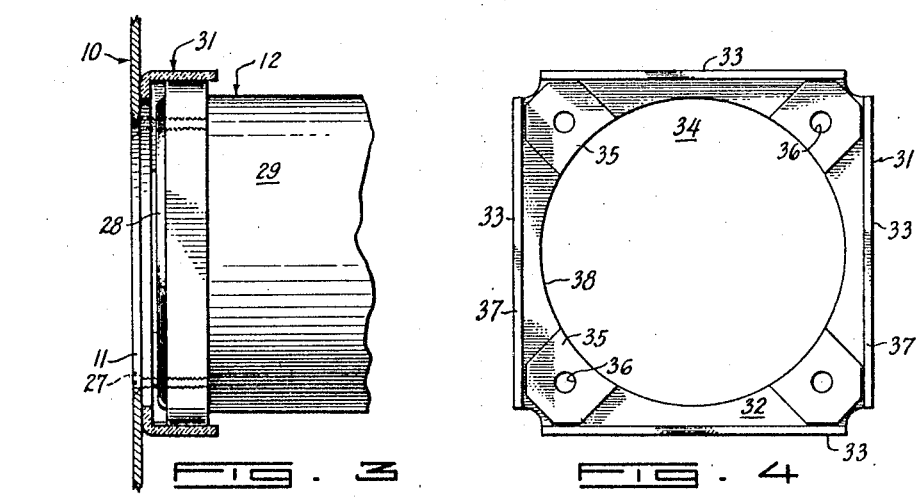
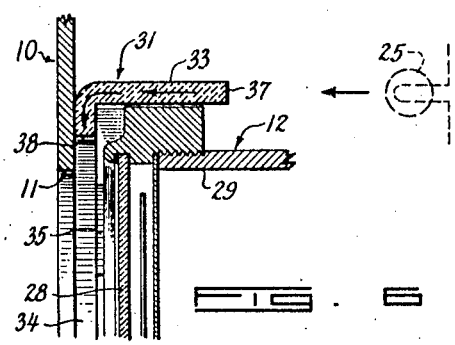
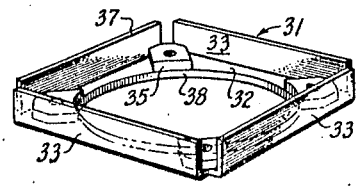
INVENTOR.
Angelo H. Leboffe
BY Walter J. Jason
ATTORNEY Patented July 31, 1951

2,562,498

UNITED STATES PATENT OFFICE 2,562,498

ILLUMINATING MEANS FOR INDICATING INSTRUMENTS

Angelo H. Leboffe, San Diego, Calif., assignor to Consolidated Vultee Aircraft Corporation, San Diego, Calif., a corporation of Delaware Application December 13, 1946, Serial No. 716,000

6 Claims. (Cl. 240—8.16)

This invention relates to instrument panels and more particularly to improved means for illuminating the faces of the various instruments contained in an instrument panel.

One object of the present invention lies in the provision of a novel means for dispersion of illumination from a concentrated source onto the face of an instrument.

Another object of the invention resides in providing an improved illuminator for an instrument comprising a light directing member of an improved construction whereby light from a point source of illumination may be projected onto an instrument face.

A further object of the invention is to provide a light directing member for use with an instrument and being of a generally cup-shaped construction with an opening in its base through which the instrument face is visible, the light directing member serving as a means for conducting light to the instrument face.

Still another object of the invention resides in the provision of an improved illuminating system for an instrument panel whereby the various instruments provided therein may be efficiently illuminated from a concealed light source and without the production of glare.

The above and other objects and features of this invention will be readily apparent to those skilled in the art from the following specification and appended drawings illustrating a certain preferred embodiment in which:

Figure 1 is a front view of a portion of an instrument panel embodying the invention;

Figure 2 is a vertical sectional view through the instrument panel illustrating several of the instruments held in place and the light source;

Figure 3 is an enlarged detail view;

Figure 4 is an elevational view of the light directing member;

Figure 5 is a perspective view of the light directing member; and

Figure 6 is an enlarged sectional view of a portion of the light directing member and an associated instrument.

Referring now more particularly to the drawings there is illustrated a usual instrument panel 10 mounted in proper position to be viewed by the operator of the airplane or other vehicle utilizing this panel. The panel 10 is provided with a plurality of suitable apertures 11 through which are visible the faces of the various flight instruments 12 utilized by the airplane. As shown, the majority of these instruments are identical to one another insofar as their size and shape of housing or casing are concerned and each will be mounted to the instrument panel 10 in the same manner. Where the instruments are of a different size than the majority, such as those instruments indicated generally at 13, the size of the apertures in the panel associated therewith will be adjusted to accommodate such instruments and appropriate changes will be made in the method of mounting to compensate for the size difference of the instruments 13.

The instrument panel 10 forms the front face of an enclosed container or housing indicated generally at 14. The top and bottom walls of this housing are formed by plate-like members 15 and 16 which are secured, as by welding, at one of their ends to a member 17 which itself is rigidly fixed to the vehicle. The member 17 provides the rear wall of the housing 14. The top and bottom walls 15 and 16 assist in the mounting of the instrument panel 10 in the desired position within the vehicle. Side walls 18, only one of which is shown, complete the enclosure 14. A pair of channel members 19 are positioned along the upper and lower edges of the instrument panel 10 and are secured thereto, as by welding, to assist in the mounting of the panel and to provide rigidity to the structure.

Positioned in an aperture 21 provided in the rear wall 17 is a cup-shaped reflector element 22 which is secured to rear wall 17 by bolts and nuts 23. A transparent circular glass plate 24, also held in position by bolts and nuts 23, closes the front of the cup-shaped reflector 22. Mounted within the reflector 22 is an incandescent light bulb 25, which is connected by usual leads 26 to a suitable source of electrical energy, not shown. It is understood that the present invention is not limited to the use of an incandescent light bulb only, as the source of light for illuminating the instrument panel 10. Any usual form of illuminator, for example, a fluorescent tube, could be utilized to effect a light source.

The interior surfaces of the top and bottom walls 15 and 16 and side walls 18 of housing 14 are treated to make them light reflecting, preferably by coating them with a material of a high light reflecting quality such as white paint. These surfaces could of course be silvered or otherwise made light reflecting and still fall within the contemplation of this invention. With the interior walls so treated light emerging from the light source, the incandescent bulb 25, is reflected from the coated walls 15, 16 and 18 toward the front wall or panel 10, which supports the various flight instruments 12.

The various flight instruments 12, are all supported in like manner within the housing 14 and upon the interior wall surface of instrument panel 10. Each of the instruments carried by the instrument panel 10 comprises a dial face 28 with suitable indicia thereon and a casing 29 and each of the instruments are so positioned relative to the various apertures 11 in panel 10 that the dial face 28 of the instrument will be readily readable from the front of the instrument panel 10. To mount each of the instruments to the panel 10 a plurality of screws 27 are passed through the panel and are threaded into the casing 29.

Also mounted upon the interior wall surface of instrument panel 10 are a plurality of light directing members 31, there being one light directing member 31 associated with each of the instruments 12. Where the instruments are of smaller size, such as instruments 13, as shown in Figure 1, one light directing member 31a can be so shaped as to service a pair of instruments.

As best shown in Figures 4 and 5 the light directing member 31 provided for each of the instruments 12 is of generally cup-shape and square in outline and comprises a base 32 from which four walls 33 extend at right angles thereto. The base 32 is provided with an annular opening 34 therethrough of a size which permits the ready viewing of the entire face of the instrument. Equally spaced about the periphery of the opening 34 and rigidly fastened, as by a suitable adhesive, to the base 32 are four spacer members or lugs 35, with a spacer member 35 being located at the juncture of two adjacent walls 33 as shown. Openings 36 are provided through each of the spacer members 35 and base 32 through which the mounting screws 27 which secure the flight instruments to the instrument panel 10 are adapted to pass to position properly and maintain the member 31 relative to the front of the instrument with which it is associated.

As best shown in Figures 2, 3 and 6 each of the light directing members 31 is adapted to receive the dial end of an instrument so that the four walls 33 thereof extend over and embrace a portion of the instrument and the base 32 lies between the instrument and the interior wall of the instrument panel 10. It is noted that the dial end 28 of the instrument does not extend into the opening 34 in base 32 but is held rearwardly spaced therefrom by the spacer elements 35 which are engaged by the front end of the casing 29 of the instrument.

The light directing members 31 are each formed of a single piece of light transmitting material, preferably of a methyl-methacrylate, a polymerized derivative of methacrylic acid. This composition is best known commercially as "Lucite." The edges 37 of the four walls 33 serve as light entering surfaces and the annular edge 38 defining the opening 34 in base 32 provides the light emitting surface. Thus light from the incandescent bulb 25 is adapted to enter the edges 37 and be conducted through walls 33 into base 32 which is at right angles to walls 33 and thence through base 32 to be emitted from the annular surface 38 and upon the dial of the instrument spaced rearwardly of base 32 to illuminate the same so that the indicia thereon may be readily and easily read.

As shown in dotted outline in Figure 1, the light directing member 31a for the flight instruments 13 is of rectangular conformation with the vertical walls thereof being longer than the top and bottom walls. This light directing member 31a for instruments 13 is operative in the same manner as the light directing members 31 for flight instruments 12 for effecting illumination of the dial faces of instruments 13. Light from the light source 25 will, in a manner similar to that illustrated in Figure 6 for instruments 12, enter the ends of the walls 33 and be transmitted to the base 34 and conducted therethrough to be emitted from the annular surfaces 38 defining the sight apertures for the dial faces of the instruments 13 to thereby illuminate these dial faces.

As is noted from Figure 2 the various flight instruments 12 and 13 mounted on the instrument panel 10 are adapted to be serviced by the single light source 25 carried by the closed housing 14 of which the panel 10 forms the forward wall. Coating the interior walls of the housing 14 with a paint having a high light reflecting quality assists in securing this end in that light will be directed toward the objects sought to be illuminated and not wastefully dispersed or absorbed, thereby effecting a more efficient utilization of the light emitted by the bulb 25.

The light directing members 31 provide an effective means for illuminating the individual dial faces to a degree sufficient to enable the vehicle operator to readily inspect the various instruments and yet without encountering glare that would hinder his vision. The manner of mounting the light directing means 31, through screws 27, adapt them to be readily replaced if necessary. They have the additional feature that a light directing member may be utilized with any one of a number of standard flight instruments and need not be customed for each individual.

While certain preferred embodiments of the invention have been specifically disclosed it is understood that the invention is not limited thereto as many variations will be readily apparent to those skilled in the art and the invention is to be given its broadest possible interpretation within the terms of the following claims:

1. In combination, a self-contained indicating device comprising a dial and a casing, and a cup-shaped light-conducting member disposed exteriorly of said indicating device for projecting light upon said dial for illumination thereof, said cup-shaped light-conducting member comprising a base having an opening therethrough and wall portions extending from said base, said casing being disposed for a portion of its length within said cup-shaped light-conducting member whereby the wall portions of the latter overlie a portion of said casing and said dial is disposed adjacent the opening in said base of the light conducting member so that said dial is visible through said opening.

2. In combination, a self-contained indicating instrument comprising a dial and a casing upon one end of which said dial is mounted, and a light-conducting and light-emitting member disposed exteriorly of said indicating instrument for projecting light upon said dial for illumination thereof, said light-conducting and light-emitting member comprising a cup-shaped member having a base portion and wall portions extending therefrom, said wall portions being positioned to embrace said end of said casing mounting the dial to locate said dial adjacent said base portion, surfaces provided on the outer ends of said wall portions whereby light may enter said wall portions to be transmitted therethrough to said base portion, said base portion having an opening therein through which said dial is visible, a wall surface defining said opening, which wall surface throughout its length, is adapted to emit light from said base portion and upon said dial.

3. In combination, a self-contained indicating instrument comprising a dial and a casing upon one end of which said dial is mounted, and a light-conducting and light-emitting member disposed exteriorly of said indicating instrument for projecting light upon said dial for illumination thereof, said light-conducting and light-emitting member comprising a cup-shaped member having a base portion and wall portions extending at right angles therefrom, said wall portions being positioned to embrace said end of said casing mounting the dial to locate said dial adjacent said base portion, surfaces provided on the outer ends of said wall portions whereby light may enter said wall portions to be transmitted therethrough to said base portion, said base portion having an annular opening therein through which said dial is visible, a circular wall surface defining said opening, which wall surface throughout its length, is adapted to emit light from said base portion and upon said dial and spacer means carried by said base portion for holding said dial spaced from said opening in said base portion.

4. In combination, in instrument panel, an enclosed housing in which said instrument panel forms a wall, a light source disposed within said enclosed housing, said instrument panel having a plurality of apertures therein, a plurality of self-contained indicating instruments mounted on said instrument panel on the interior surface thereof, each of said indicating instruments having a dial face which is located adjacent an aperture for ready viewing thereof when said indicating instruments are in mounted position, a light conducting member associated with each of said plurality of indicating instruments and disposed exteriorly thereof, each of said light conducting members having a base portion thereof positioned between the indicating instrument with which it is associated and the interior surface of the instrument panel, said portion having an opening therein through which the dial face of the associated indicating instrument is visible, wall portions extending from said base portion and directed generally toward said light source and adapted to receive light therefrom for transmittal to said base portion, which latter portion emits said transmitted light upon the dial face associated therewith.

5. In combination, an instrument panel, an enclosed housing of which said instrument panel forms a wall, a light source disposed within said enclosed housing, reflecting surfaces provided on certain other walls of said housing whereby light rays from said light source are directed toward said instrument panel, said instrument panel having a plurality of apertures therein, a plurality of self-contained indicating instruments mounted on said instrument panel on the interior surface thereof, each of said indicating instruments having a dial face which is located adjacent an aperture for ready viewing thereof when said indicating instruments are in mounted position, a cup-shaped member formed of light transmitting material associated with each of said plurality of indicating instruments and disposed exteriorly thereof, said cup-shaped member comprising a base portion which is located between the interior surface of the instrument panel and its associated indicating instrument and adjacent the dial face thereof, said base portion having an opening therein through which said dial face is visible, wall portions extending from said base portion and being directed generally toward the light source whereby light from said light source is transmitted through said wall portions to said base portion and emitted through the opening therein upon the dial face disposed adjacent thereto.

6. In combination, in instrument panel, an enclosed housing of which said instrument panel forms a wall, a light source disposed within said enclosed housing, reflecting surfaces provided on certain other walls of said housing whereby light rays from said light source are directed toward said instrument panel, said instrument panel having a plurality of apertures therein, a plurality of self-contained indicating instruments, means mounting said indicating instruments on said instrument panel on the interior surface thereof, each of said indicating instruments having a dial face which is located adjacent an aperture for ready viewing thereof when said indicating instruments are in mounted position, a plurality of light conducting members mounted on the interior surface of said instrument panel, said light conducting members each comprising a cup-shaped body into which one end of an associated indicating instrument is adapted to extend, said cup-shaped body comprising a base portion having an annular opening therein, which base portion lies adjacent the dial face of the associated indicating instrument so that said dial face is visible through said annular opening, an annular wall defining said annular opening, wall portions extending from said base portion and generally toward said light source, surfaces provided on the ends of said wall portions whereby light rays from said light source enter said wall portions for transmittal to said base portion from which said transmitted light is emitted through said annular wall and upon the associated dial face for illumination thereof.

ANGELO H. LEBOFFE.

REFERENCES CITED

The following references are of record in the file of this patent:

UNITED STATES PATENTS

| Number | Name | Date |
|---|---|---|
| 1,739,954 | Du Pont | Dec. 17, 1929 |
| 2,078,121 | Broyles | Apr. 20, 1937 |
| 2,145,931 | Hills | Feb. 7, 1939 |
| 2,150,836 | Lamb | Mar. 14, 1939 |
| 2,214,595 | Rights | Sept. 10, 1940 |
| 2,286,014 | Rowe | June 9, 1942 |
| 2,411,306 | Gaasbeek | Nov. 19, 1946 |
| 2,413,848 | Simpson | Jan. 7, 1947 |
| 2,426,713 | Simpson | Sept. 2, 1947 |
| 2,537,971 | Dames | Jan. 16, 1951 |

FOREIGN PATENTS

| Number | Country | Date |
|---|---|---|
| 247,423 | Great Britain | Feb. 18, 1926 |